June 29, 1954  R. JACKSON  2,682,347
MOTORIZED HAND TRUCK WITH LOAD CLAMPING CARRIER
Filed Jan. 12, 1952  6 Sheets-Sheet 1
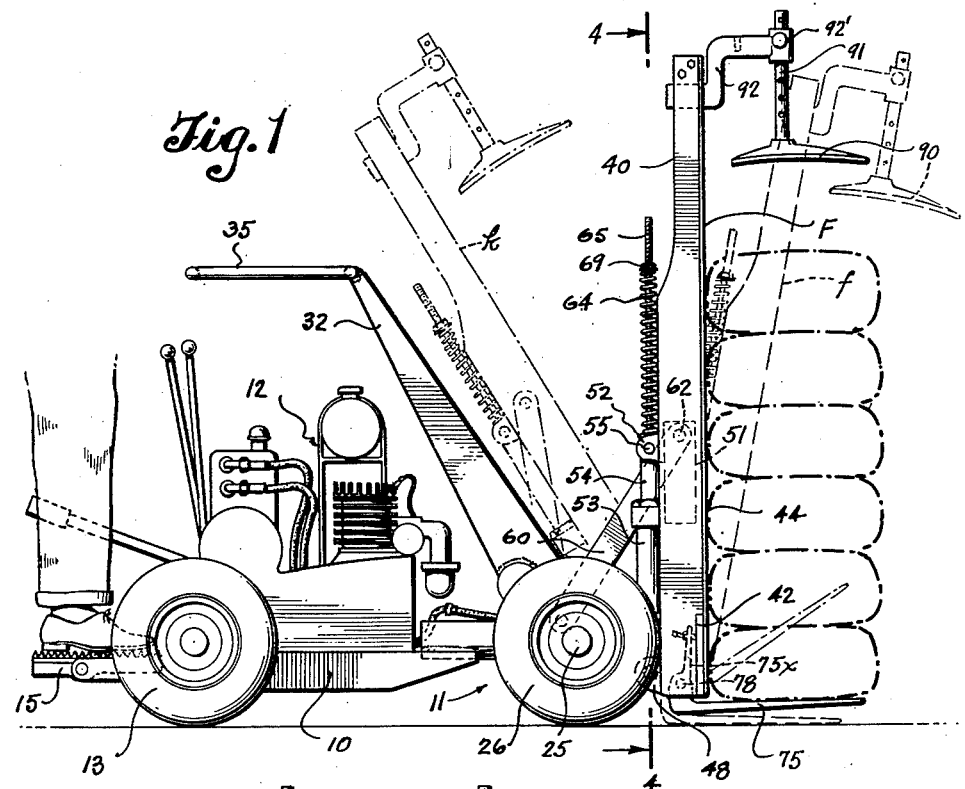
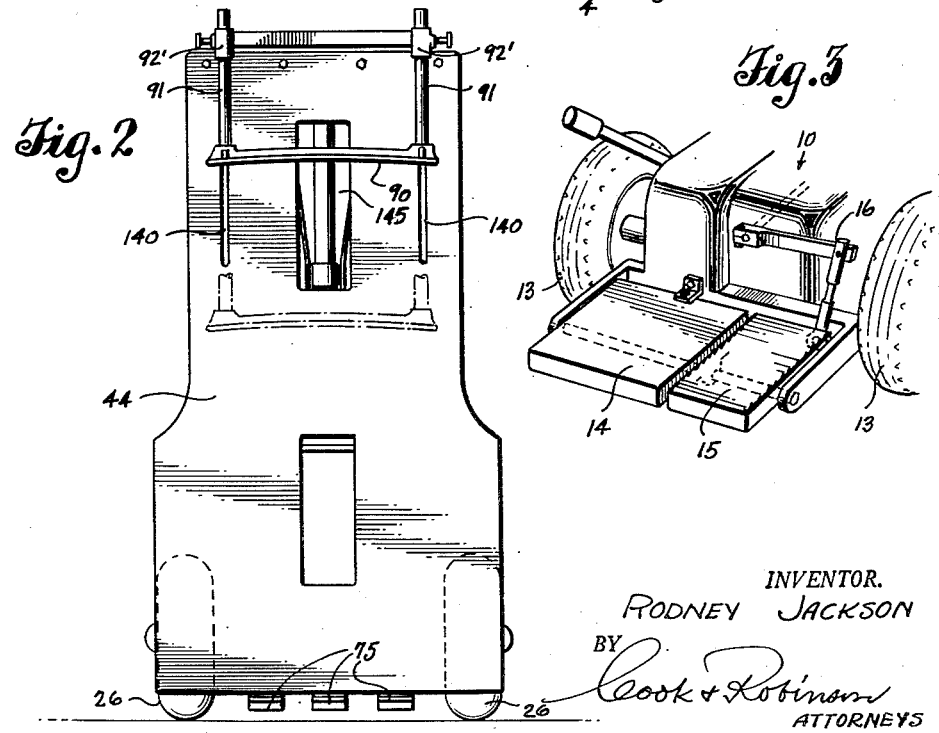
INVENTOR.
RODNEY JACKSON
BY
Cook & Robinson
ATTORNEYS

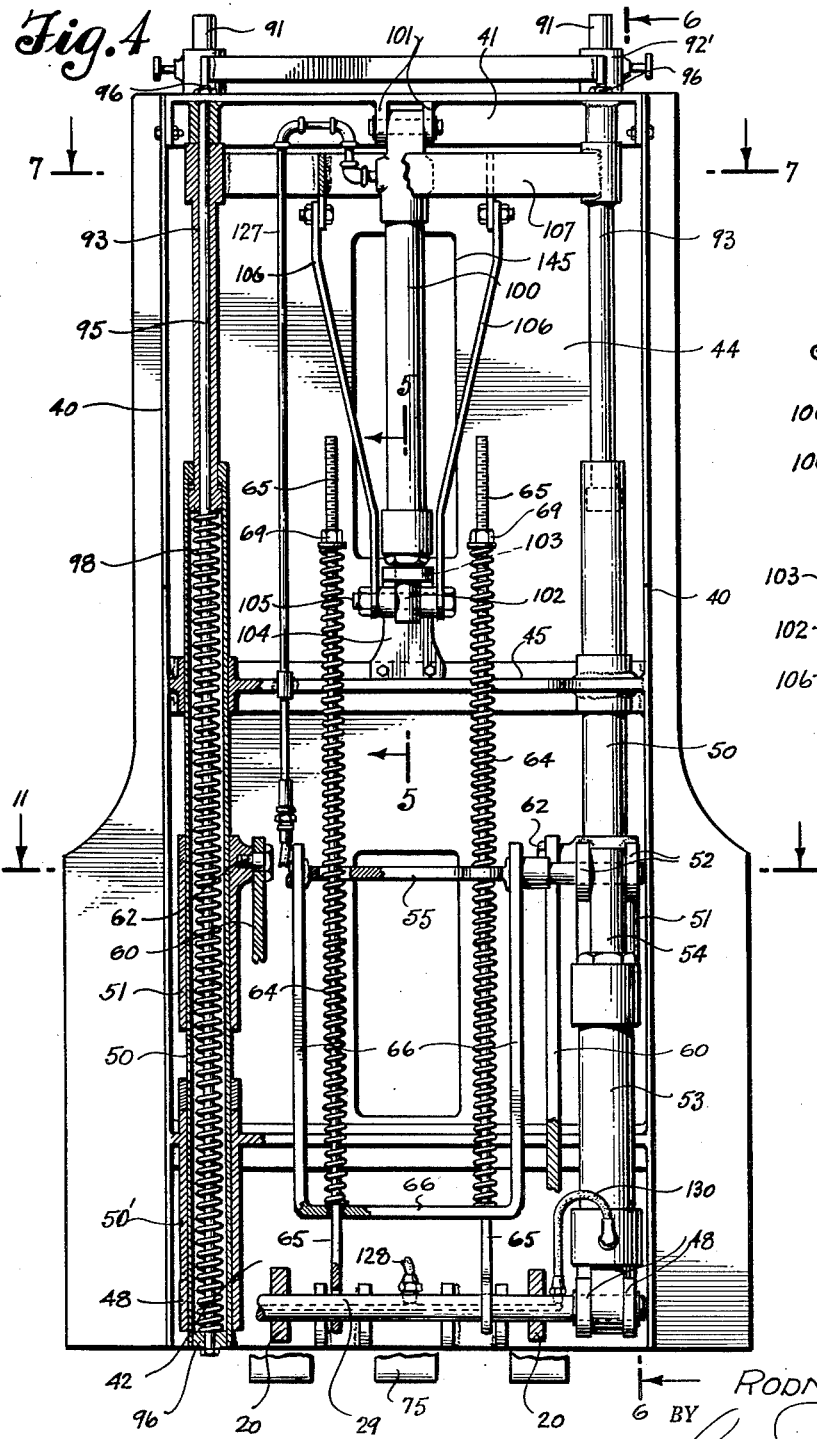

June 29, 1954  R. JACKSON  2,682,347
MOTORIZED HAND TRUCK WITH LOAD CLAMPING CARRIER
Filed Jan. 12, 1952  6 Sheets-Sheet 3
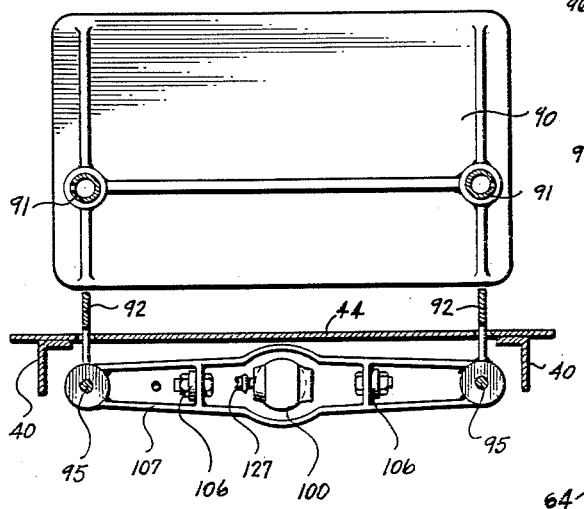
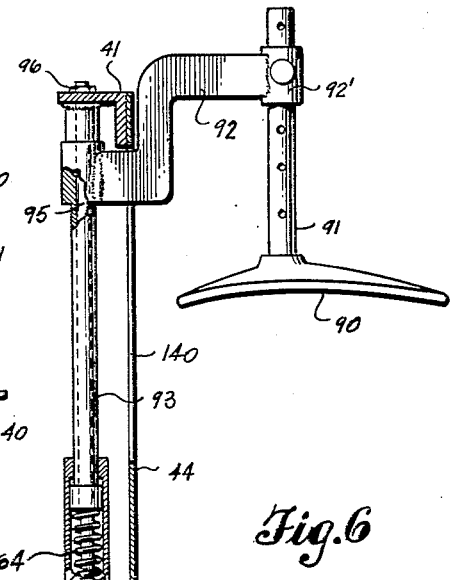
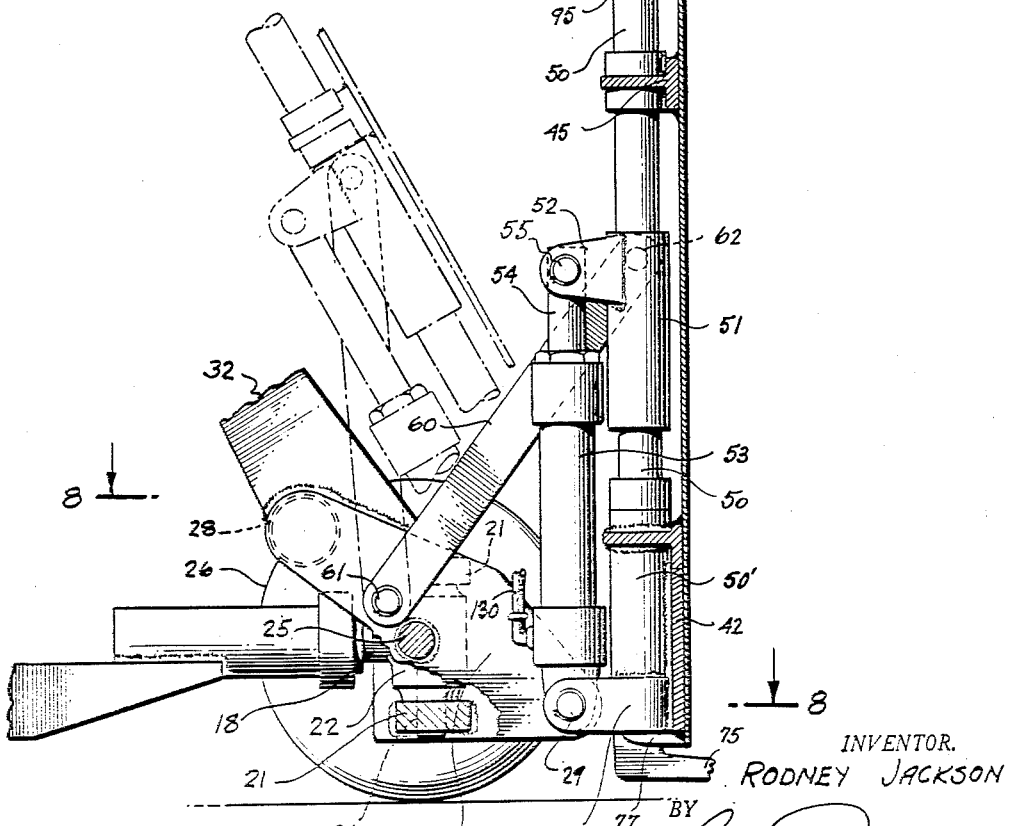
INVENTOR.
RODNEY JACKSON
BY
Cook & Robinson
ATTORNEYS

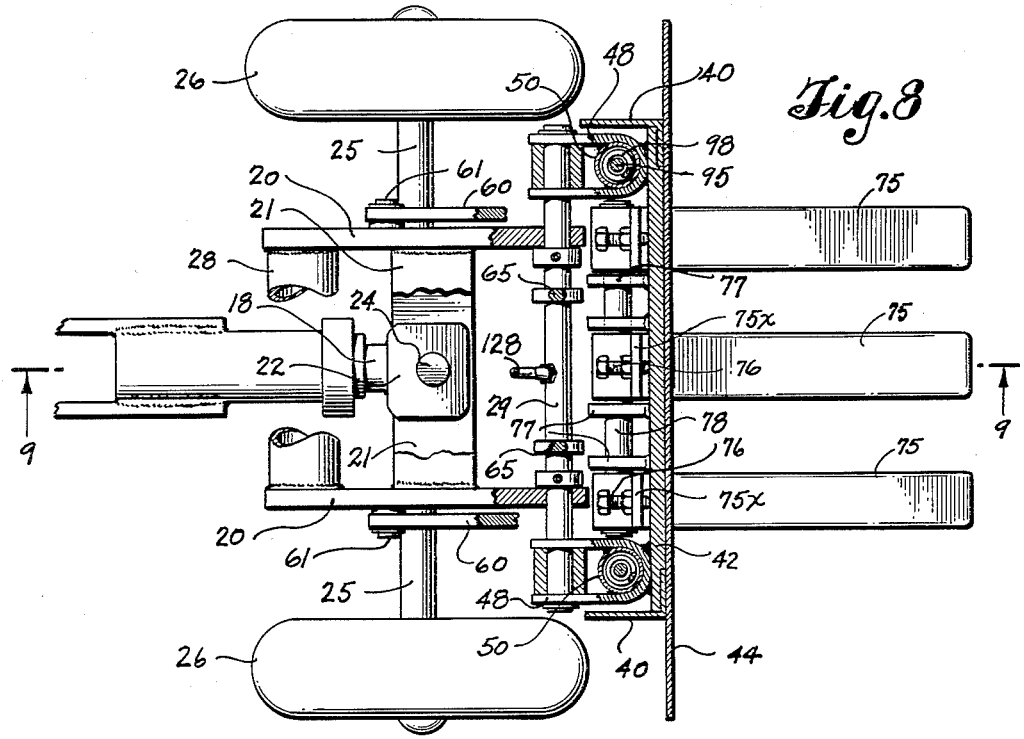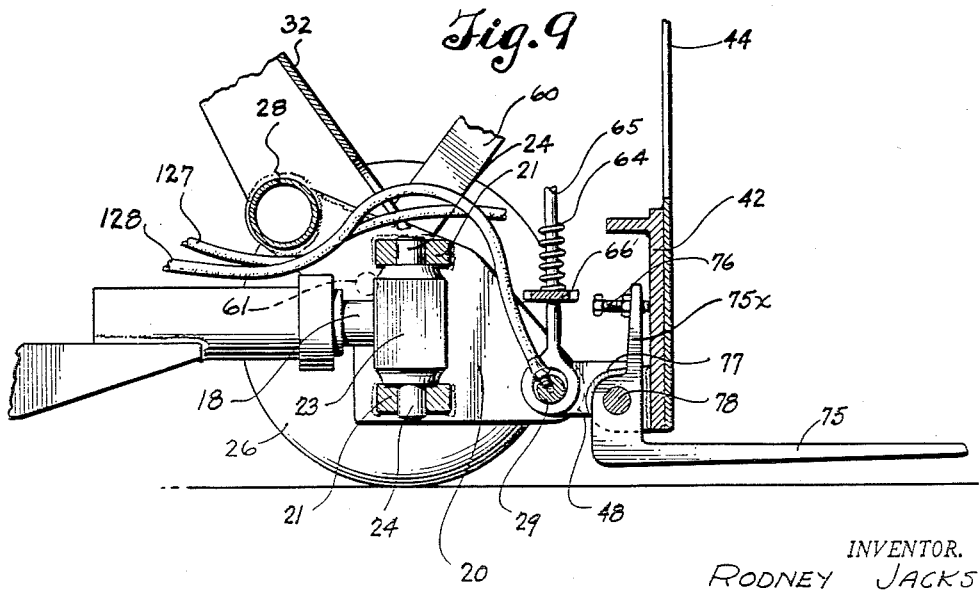

June 29, 1954 R. JACKSON 2,682,347
MOTORIZED HAND TRUCK WITH LOAD CLAMPING CARRIER
Filed Jan. 12, 1952 6 Sheets-Sheet 5

INVENTOR.
RODNEY JACKSON
BY Cook + Robinson
ATTORNEYS

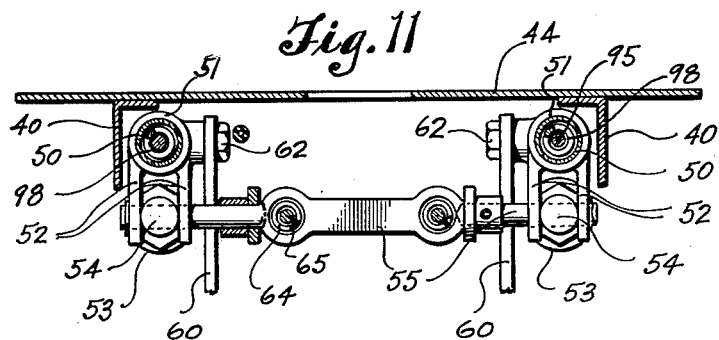
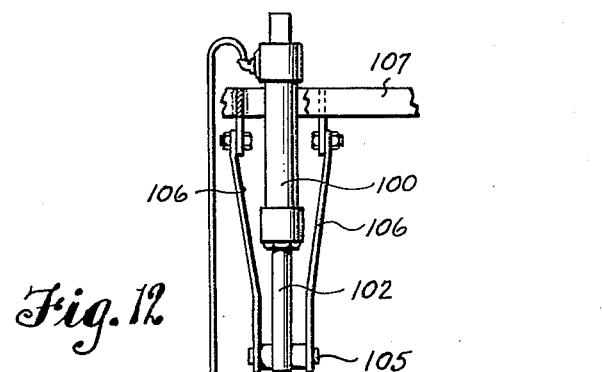
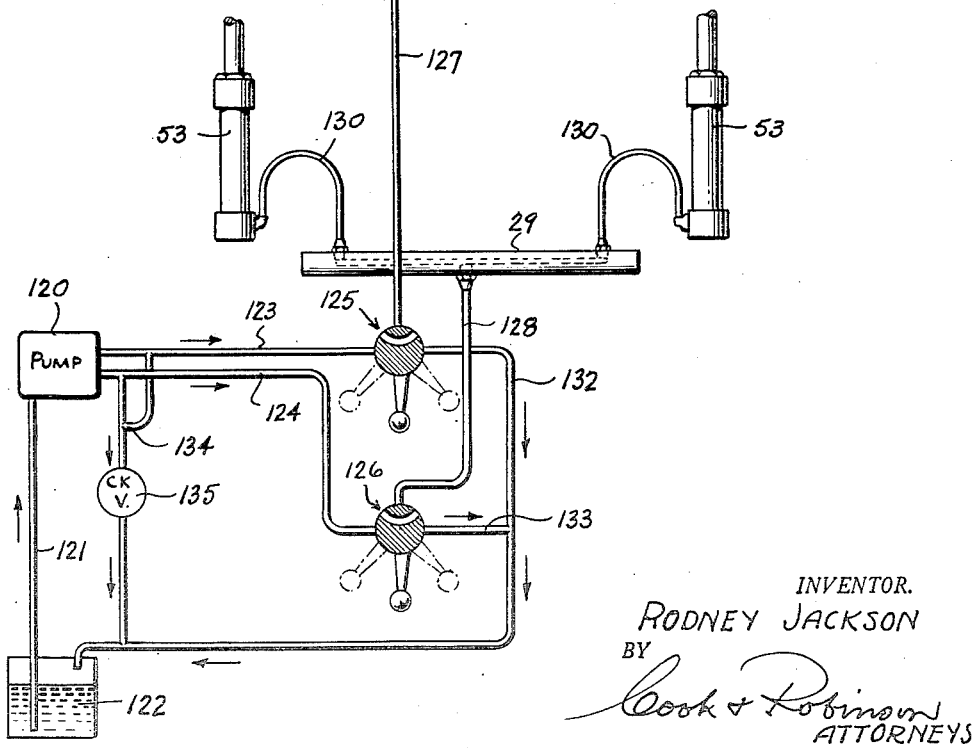

Patented June 29, 1954

2,682,347

UNITED STATES PATENT OFFICE 2,682,347

MOTORIZED HAND TRUCK WITH LOAD CLAMPING CARRIER

Rodney Jackson, Seattle, Wash., assignor to Paul J. Isaacson and F. T. Isaacson

Application January 12, 1952, Serial No. 266,140

7 Claims. (Cl. 214—147)

1

This invention relates to motorized hand trucks, and it has reference more particularly to a novel form of load carrier and an operating mechanism therefor as applied to a hand truck for the picking up, transporting and depositing of stacked bags or packages of material; the invention being characterized by the combination of a tiltable, load pick-up and carrier frame with fingers at its lower end for picking up the stacked bags or packages, and a clamping plate arranged in coacting relationship with the frame and fingers for holding a stack while being loaded onto the truck, transported and unloaded.

It is the principal object of this invention to provide improvements of the kind and character above stated that are applicable to trucks of the type shown in U. S. patent to J. L. Waters, No. 2,377,389, or that shown in the co-pending application of Dan A. Lyons filed on November 7, 1947, under Serial No. 784,547, now Patent No. 2,570,256; wherein the illustrated truck comprises a chassis with a front end wheel supported steering section having a frame structure on which a load carrier frame is pivoted for movement between an upright, or somewhat forwardly inclined loading position and a rearwardly inclined load transporting position, to permit the load to be easily picked up from a floor surface and then by the rearward inclining of the carrier frame to be disposed and held in a position of substantial balance over the axial line of the supporting wheels of the front section.

Another object of the invention is to provide a practical, easily controlled and substantial stack clamping means, that is power operated, under the control of the truck operator while standing on the truck, to engage with and hold a stack on the carrier while being picked up and while being transported.

Yet another object of the invention is to provide a novel hydraulic system for easy control of the stack clamping mechanism and for effecting the movements of the load carrier frame between load engaging, lifting and rearwardly inclined transporting positions.

Still further objects and advantages of the invention reside in the details of construction and combination of the various parts, and in their mode of operation, as will hereinafter be fully described.

In accomplishing these and other objects of the invention, I have provided the improved details of construction, the preferred forms of which are illustrated in the accompanying drawings, wherein—

2

Fig. 1 is a side view of a hand truck that is equipped with a load carrying frame and clamping mechanism embodied by the present invention.

Fig. 2 is a front end view of the same.

Fig. 3 is a perspective view of the rear end portion of the truck, showing the operator's platform and the driving and braking control pedal.

Fig. 4 is an enlarged cross-sectional view of the truck, taken on the line 4—4 in Fig. 1, showing the arrangement of parts for the actuation of the clamping plate and for the tilting adjustment of the carrier frame on its support.

Fig. 5 is a sectional detail taken on line 5—5 in Fig. 4, showing the attachment of the piston rod of the hydraulic cylinder of the clamp actuating jack to the clamp closing links.

Fig. 6 is a vertical section, taken substantially on line 6—6 in Fig. 4.

Fig. 7 is a horizontal section taken through the carrier frame on line 7—7 in Fig. 4.

Fig. 8 is a horizontal section taken substantially on line 8—8 in Fig. 6.

Fig. 9 is a vertical section taken substantially on the line 9—9 in Fig. 8.

Fig. 11 is a horizontal section, taken on line 11—11 in Fig. 4.

Fig. 12 is a view diagrammatically showing the hydraulic control system for the jacks.

Figure 10:
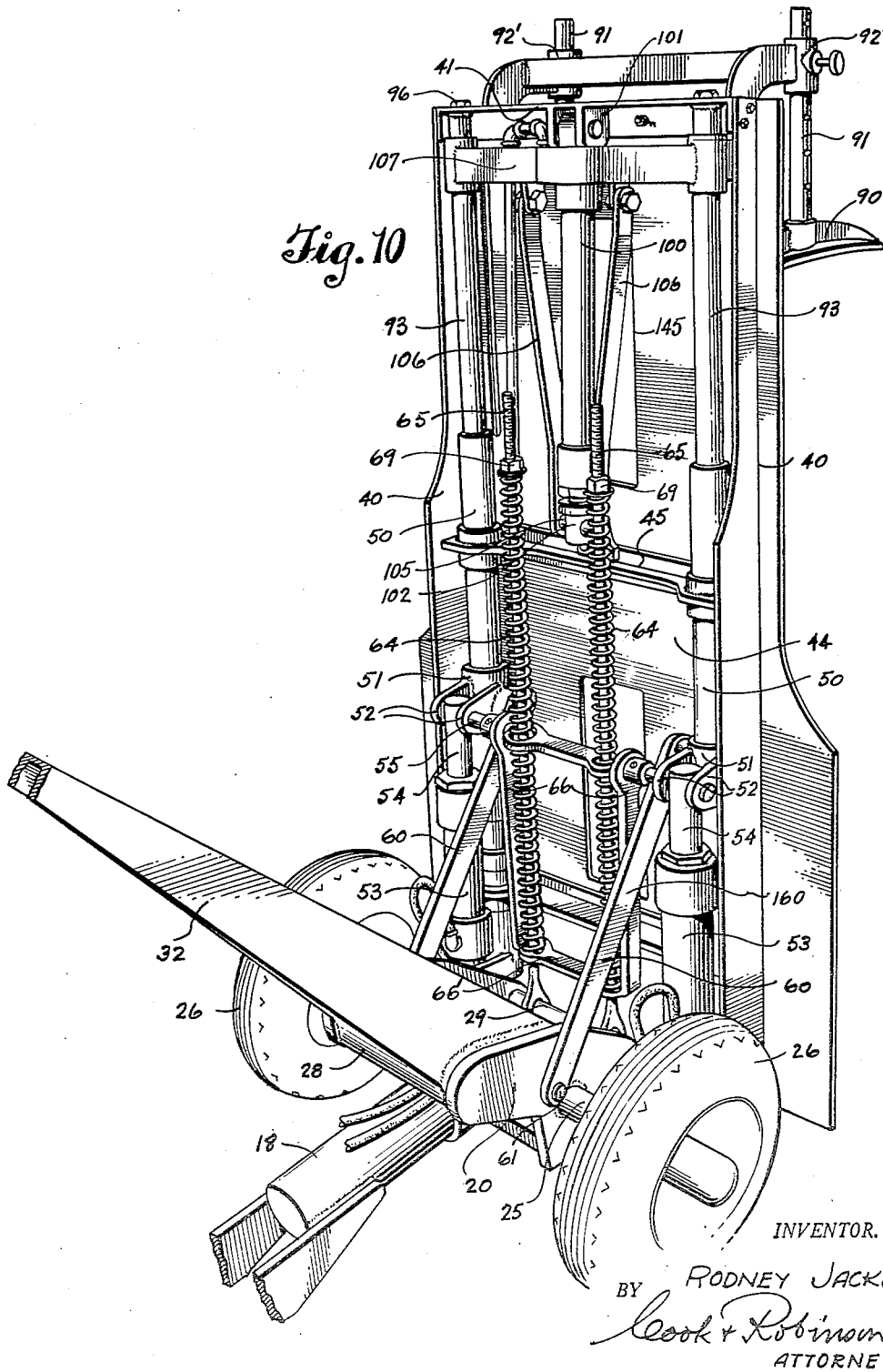
Fig. 10 is a perspective view showing the back side of the carrier frame and the hydraulic jack for actuation of the stack clamping plate and those for effecting the movement of the carrier frame on its pivotal mounting.

Referring more in detail to the drawings—

Fig. 1 illustrates a type of truck to which the present improvement has been adapted, and also illustrates the load carrier frame and the stack clamping plate of the present invention as applied to the carrier frame. Like the truck of the previously mentioned Lyons application, the present truck comprises pivotally connected rear end and front end sections, 10 and 11; the rear end section 10 having a truck driving engine 12 mounted thereon and operatively connected with supporting and driving wheels 13—13 through the mediacy of a forward and reverse driving and braking mechanism, not herein shown, but which may be like that of my co-pending application executed on July 24, 1951, and filed under Ser. No. 239,281. The rear section also is equipped with a platform 14 on which the operator stands, and adjacent thereto as best shown in Fig. 3, is a pivotally mounted foot pedal 15, connected with the driving and braking mechanism for its control by linkage shown at 16.

The rear section 10 is equipped with a swivel spindle member 18 which has pivotal connection at its forward end with the frame structure of the forward section; this connection being best shown in Figs. 8 and 9 wherein it is observed that the said frame structure comprises vertically disposed, laterally spaced opposite side plates 20—20, rigidly joined intermediate their ends by vertically spaced cross-bars 21—21. The spindle member 18 has a block 23 at its forward end disposed between the cross-bars 21—21 and pivoted thereto by means of vertically aligned trunnions 24—24 which extend from top and bottom sides of the block into holes provided therefor in the bars.

Extended outwardly from the side plates 20—20, in transverse alignment, are axles 25—25 mounting wheels 26—26 thereon which cooperate with the wheels 13—13 for the support of the truck. The side plates 20—20 extend forwardly and rearwardly of the axles 25—25, and are rigidly joined across their rear ends by a tubular connecting member 28, and at their forward ends have a tubular, horizontal cross-shaft 29 mounted therein with its opposite end portions extended beyond the plates, as well shown in Fig. 8; this shaft being the support for the load carrier frame as presently explained.

Steering of the truck is effected by pivotal action of the front end section on the trunnions 24—24. This is accomplished through a steering post 32 that is fixed centrally to the front end structure by welded connections with plates 20—20 as seen in Figs. 1 and 10. The post extends upwardly and rearwardly at about a 35° angle and is equipped at its upper end with a horizontally and rearwardly extended handle 35 adapted to be easily grasped by the operator when riding on the platform 14.

The load carrier frame which is designated in its entirety in Fig. 1 by reference character F is of rigid rectangular form and mounted at the forward end of the front end section 11 on the cross-shaft 29, for pivotal movement between a forwardly inclined position, indicated at f in Fig. 1 and a rearwardly inclined and somewhat lifted position of support for transportation, indicated at k. This load carrier frame comprises parallel, opposite side beams 40—40, joined in spaced relationship across their upper ends by a cross-bar 41, and across their lower ends by a flat vertically disposed plate 42. Secured to the rectangular frame that is thus formed, and overlying its entire area at the front side thereof and to the full width of the truck wheels is a flat plate 44. Also, there is a horizontal brace bar 45 extended between the side beams about mid-way of their lower and upper ends and this bar is welded or otherwise rigidly fixed to the side beams and plate as shown in Figs. 4 and 6.

Welded to the back side of the cross plate 42, at its opposite ends and adjacent its lower edge, are rearwardly directed U-shaped brackets 48—48, the ends of the leg portions of which are pivotally mounted on the outer end portions of the cross shaft 29, as observed in Fig. 8. The base ends of the U-shaped brackets have the lower end portions of tubular guide shafts 50—50 welded therein; these shafts being extended upwardly, through sleeves 50' fixed to plate 42, and then upwardly through and beyond the cross member 45 of the load carrier frame, as seen in Figs. 4, 6 and 10.

Slidably fitted about each of the shafts 50—50, below the cross-beam 45, is a sleeve 51, and from the upper ends of these sleeves, spaced ears 52 extend rearwardly. Mounted vertically between the brackets 48 and ears 52, at the opposite sides of the frame, are hydraulic jacks, each comprising a cylinder 53 that is pivotally mounted at its lower end on the cross shaft 29 between the arms of the corresponding bracket 48, and a piston rod 54 that extends upwardly from the cylinder. The upper ends of the two piston rods are pivotally mounted between the spaced ears 52 of the corresponding sleeves 51 by means of a cross shaft 55 that is extended through these parts as well shown in Figs. 6 and 10.

Application of a hydraulic pressure medium to the lower ends of the jack cylinders, as presently described, causes the upward extending of the piston rods 54 and the sliding of the sleeves 51 upwardly along the guide shafts 50—50.

Extended from the opposite side plates 20—20 of the frame structure of the front end section of the truck to the upper end portions of the sleeves 51—51, are links 60—60. These links, as shown in Figs. 4, 6 and 10, have their lower ends pivotally joined to the said side plates by pivot bolts 61 and their upper ends are likewise joined to the sleeves 51 by pivot bolts 62. By reason of the connection as provided by these links 60—60, it will be understood that when the jack piston rods are upwardly extended and the sleeves 51 moved upwardly along the guide shafts 50—50, the upper end of the load carrier frame will be caused to swing rearwardly about its mounting shaft 29. Likewise, when the sleeves 51—51 are moved downwardly, the upper end of the carrier frame will be caused to swing forwardly. Through this action of the two hydraulic jacks, the load carrier frame can be swung between the rearwardly reclining position of rest, indicated by its dotted line position k in Fig. 1, and the forwardly inclined position indicated at f in dotted lines in the same view.

While the upward lifting and rearward inclining of the carrier frame from the full line position of Fig. 1 is effected by the application of a hydraulic medium to the jack cylinders 53—53, the return to upright position is effected by weight of the load as supplemented by pressure of a pair of coiled springs 64—64. These springs, as shown in Figs. 4 and 10, are mounted about elongated rods 65—65 which are looped at their lower ends about the cross-shaft 29 and extend upwardly therefrom, through the horizontal base bar 66' of a yoke-like member 66 that is pivotally suspended from the cross-shaft 55 that extends horizontally between the brackets 52—52. The upper ends of the springs 64 seat against nuts 69 that are adjustably applied to the upper ends of the rods, 65—65, and their lower ends bear against the cross bar 66' and thus, through the yoke and shaft 55, urge the pistons downwardly in the jack cylinders and by retracting the same, urge the carrier frame toward its forwardly inclined position. The manual control of the flow of the hydraulic medium from the jack cylinders makes possible any desired positioning of the load carrier frame in a lowering operation.

Supported by and extending forwardly from the lower cross plate 42 of the load carrier frame, are the load pick-up fingers 75, herein shown to be three in number and arranged in spaced relationship as noted in Fig. 8. Each finger comprises an elongated, flat and outwardly tapered load supporting portion that is adapted to be rested flatly upon a floor surface by the swinging of the carrier frame to its forwardly inclined position of Fig. 1, and an upwardly extended lever portion 75x at the inner end of the finger. The several levers 75x are mounted pivotally between spaced ears 77 fixed to the back side of the plate 42 on a pivot shaft 78 extended through the ears as illustrated in Figs. 8 and 9. Also, each lever 75x is equipped at its upper end with an adjusting bolt 76 threaded therethrough to be engaged with the back side of the plate. By adjustment of these bolts, the position of the outer ends of the fingers can be regulated. The pivotal mounting of these pick up fingers on shaft 78 permits a relative upward swinging of the fingers after they have been brought into ground contact should the frame continue to be swung forwardly.

The length of the pick-up fingers 75 is such as to adapt them for the pick-up of stacks of sacked grain or the like, as indicated in dotted lines in Fig. 1, and the stack can be of a height substantially to the top of the carrier frame.

For the support of the stacked bags or other articles during a loading operation and while being transported, I provide a clamp plate 90 that is disposed in position to be actuated against the upper end of the stacks after it has been picked up on the fingers 75 but before the load carrier frame has been actuated to its rearwardly inclined position. The clamp plate is of rectangular form, slightly arched as shown in Fig. 6, and horizontally disposed, and is supported by opposite end posts 91—91 that extend upwardly therefrom as has been best shown in Figs. 1, 6 and 7. The posts are adjustably contained in bearings 92' at the outer ends of brackets 92 that have their forward ends upwardly offset and have their rearward ends fixed to the upper ends of tubular slides 93 located at opposite sides and rearward of the upper end portion of the carrier frame as shown in Figs. 4, 6 and 10.

Referring more particularly to Fig. 4, it will be observed that the tubular slides 93 extend as piston rods from the upper ends of the tubular guides 50—50 previously described. It is also shown in Fig. 4, that rods 95—95 of small diameter are fixed to plugs 96 in the lower ends of the guide tubes 50—50 and extend coaxially of the tubes 50—50 and slides 93—93 to the top cross-bar 41, wherein they are secured by nuts 96. The slides 93 are telescopically movable within the upper end portions of their respective guides 50, and they are urged to their outer limits of travel by elongated coiled springs 98 that are contained in the tubes 50 and at their opposite ends bear against the lower ends of the guides 93 and the plugs 96. Thus the springs 98—98 operate to urge the clamp plate to its upper limit as seen in Fig. 1 when it is permitted to be so moved.

To actuate the clamp plate downwardly against a stack, as picked up on the fingers 75, I provide a hydraulic jack that has been shown in Figs. 4 and 10, to comprise a vertically disposed hydraulic cylinder 100 that is attached at its upper end to spaced ears 101 that is fixed centrally to a cross-bar 41. Extended from the lower end of the cylinder is a piston rod 102. This has a freely guided travel through a hole 103 in a bracket 104 that is fixed to the cross-bar 45 as shown in Fig. 5. At its lower end the piston rod is connected by a cross-pin 105 to the lower ends of a pair of pull links 106—106 which, at their upper ends, are connected to a cross bar 107 that extends between and is welded to the upper ends of the slides 93—93. Thus, when a hydraulic medium is delivered into the upper end of the cylinder 100, it actuates the piston rod downwardly and, through the mediacy of the links 106—106, pulls the slides 93—93 downwardly and moves the clamp plate accordingly. The clamp plate can, in this way, be actuated against the upper end of the stack as supported on the fingers 75, and the stack held secure while the carrier frame is being tilted to its rearwardly reclining position for the transportation of the load. The clamp plate, as so engaged with the upper end of the stack, also will prevent any accidental tip over of the stack when the carrier frame is brought back to a forwardly inclined position for the unloading of the stack.

The control system for the application of hydraulic medium to and from the jack cylinders 53—53 and 100 is shown in Fig. 12. In this view, 120 designates a pump that is preferably driven by the engine 12 through any suitable driving connection. The intake side of the pump has a pipe connection 121 with an oil supply tank 122, and its discharge side has delivery pipes 123 and 124 leading respectively to control valves 125 and 126. Valve 125 has a pipe line 127 leading to the upper end of the jack cylinder 100, and valve 126 has a pipe connection 128 with the tubular shaft 29, and this has flexible conduits 130—130 leading therefrom to the lower ends of the jack cylinders 53—53. The tubular pivot shaft 29 is bored and plugged at its ends to serve the purpose of a distributing manifold. The system also includes return lines 132—133 from the valves 125—126, connecting with tank 122, and a relief line 134 for lines 123 and 124, leading to the tank with a pressure relief valve 135 in this connection.

It is shown in Figs. 2 and 6 that the bracket arms 92—92 extend forwardly and through vertical slots 140 in the plate 44 that are of such length that there is no interference by the plate 44 to full travel of the clamp. Also, the plate 44 is formed with a relatively large cut-out 145 in its upper portion through which an operator can observe what is forward of the carrier. It is provided also that the clamp plate supporting posts 91 are adjustable in bearings 92' to adjust the position of the clamp to accommodate stacks of varying height.

With the truck and carrier frame so constructed and assembled, its use is as follows: Assuming a stack of sacked material or the like, such as that shown in dotted lines in Fig. 1, is to be picked up, it is approached by the truck with the carrier frame forwardly inclined, the clamp plate fully raised, and the pick up fingers 75 lying flatly on the floor. The truck is advanced to project the fingers beneath the stack. Then the clamp plate is actuated downwardly against the top of the stack by the opening of valve 125 to admit pressure medium to the jack cylinder 100, after which closing of the valve holds the clamp secure.

With the stack so clamped, the carrier frame is tilted to its rearwardly inclined position by opening valve 126 and admitting pressure medium to the lower ends of jack cylinders 53—53. When the carrier frame has been so inclined, the load can be transported to a place of unloading, in substantial balance over the front wheels of the truck. To unload, the valve 126 is adjusted to permit the hydraulic medium to flow from the cylinders back to the tank 20. The springs 64—64, supplemented by the weight of the load and by the operator litfing on the handle 35, if necessary, returns the carrier to upright position whereby the stack is deposited on the floor. The clamp is then lifted upon the opening valve 125, by coiled springs 98—98, and then upon backing the truck the stack will be deposited on the floor.

The truck, as so equipped with load carrier frame and hydraulic clamp is especially suited for the handling of stacks of sacked material, such as grain, flour, cement or other like products. However, it can be similarly used for handling boxes or packages, and it is not the intent that it be restricted to use with any specific material or kind of packages.

Having thus described my invention, what I claim as new therein, and desire to secure by Letters Patent, is:

1. In a truck of the character described having a front end steering section and a load carrying frame pivotally supported at its lower end from said steering section for tilting adjustment between substantially upright and a rearwardly inclined position of rest, load carrying means extended forwardly from the lower end of said frame, vertically directed guide means fixed rigidly to the frame, a slide telescopically contained in the means and extending from the upper end thereof, a load clamping means supported from said guide means forwardly of the frame, means yieldingly urging the slide to its upward limits of travel, and a power operated means for pulling the slide downwardly.

2. In a truck of the character described having a forward end steering section; a load carrying frame pivotally supported at the front of said section and including load supporting means extended forwardly from the lower end thereof; a pair of transversely spaced and vertically directed tubular guides rigidly mounted on the back side of said frame, slides telescopically contained in said tubular guides and extended from the upper ends thereof for limited up and down travel, springs contained in the tubular guides and acting against the slides to move them to their upward limits of travel, brackets fixed to the upper ends of said slides and extended forwardly of the frame, a clamp plate mounted by the brackets forwardly of the frame, and a hydraulic cylinder mounted on the frame and means connecting the piston rod of said cylinder to the slides for moving them downwardly and against a load as supported by the said load supporting means.

3. A combination as recited in claim 2 wherein said load carrying frame has a flat back plate against which a load as supported by the frame may rest when the frame is rearwardly inclined and wherein said plate has vertical slots formed therein through which the said clamp plate mounting brackets extend and are movable for the adjustment of the plate to and from clamping position.

4. A combination as recited in claim 2 wherein said load carrying frame has a flat back plate against which a load as supported by the frame may rest when the frame is rearwardly inclined and wherein said plate has vertical slots formed therein through which the said clamp plate mounting brackets extend and are movable for the adjustment of the plate to and from clamping position and wherein the clamp plate is equipped at its ends with vertical posts that are vertically adjustable in the brackets.

5. A truck of the character described having a front end steering section and a load carrying frame pivotally supported at its lower end from said steering section for tilting adjustment between substantially upright and a rearwardly inclined position of rest, load supporting means extended forwardly from the lower end of said frame, paired vertically directed and transversely spaced tubular guides fixed rigidly to the back side of the frame, slides telescopically contained in the tubular guides and extended from the upper ends thereof, brackets fixed to the upper ends of the slides and extended forwardly of the frame, a load clamping plate mounted by said brackets, spring means in the tubular guides acting against the slides to lift the clamp plate, a hydraulic means on the frame operable to pull the slides downwardly to lower the clamp plate, sleeves applied about the tubular guides and movable therealong, links connected at opposite ends to the slides and to the said steering section rearwardly of the pivot axis of the load carrying frame, and a hydraulic cylinder on the frame operable to shift the sleeves upwardly along the guides to move the frame to a rearwardly inclined position.

6. A truck as in claim 5 including spring means for moving the sleeves downwardly for the return of the frame to upright position.

7. A truck as in claim 1 wherein the said load carrying means extended from the lower end of the frame comprises a plurality of flat bars, pivotally mounted at their base ends and formed with upwardly directed arms, and adjusting bolts threaded through the arms and engaged with the frame structure to limit the downward drop of the outer ends of the bars.

References Cited in the file of this patent

UNITED STATES PATENTS

| Number | Name | Date |
|---|---|---|
| 1,843,735 | Remde | Feb. 2, 1932 |
| 1,843,736 | Remde | Feb. 2, 1932 |
| 1,900,569 | Lederer | Mar. 7, 1933 |
| 2,281,012 | Sears | Apr. 28, 1942 |
| 2,306,713 | Prucha | Dec. 29, 1942 |
| 2,377,389 | Waters | June 5, 1945 |
| 2,520,564 | Reagle | Aug. 29, 1950 |
| 2,536,151 | Backofen et al. | Jan. 2, 1951 |
| 2,554,433 | Warren | May 22, 1951 |
| 2,578,802 | Heidrick et al. | Dec. 18, 1951 |
| 2,591,544 | Hegarty | Apr. 1, 1952 |
| 2,593,820 | Weiss | Apr. 22, 1952 |
| 2,596,477 | Frischmann et al. | May 13, 1952 |
| 2,606,680 | Herman | Aug. 12, 1952 |
| 2,611,497 | Backofen | Sept. 23, 1952 |